March 14, 1967 D. B. BADGLEY 3,308,654
METHOD AND APPARATUS FOR TESTING TENDERNESS
Filed Oct. 3, 1963 2 Sheets-Sheet 1
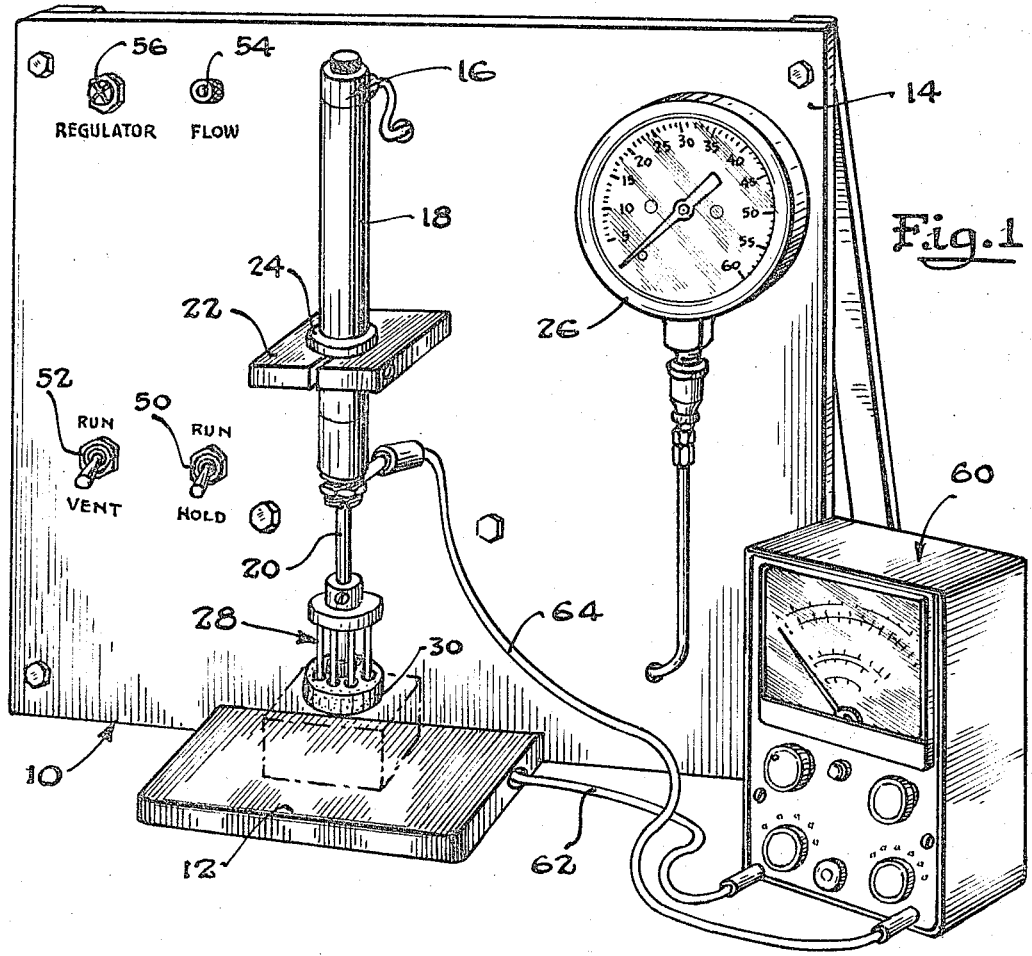
Inventor
DURWARD B. BADGLEY
By R.A. Story
Attorney

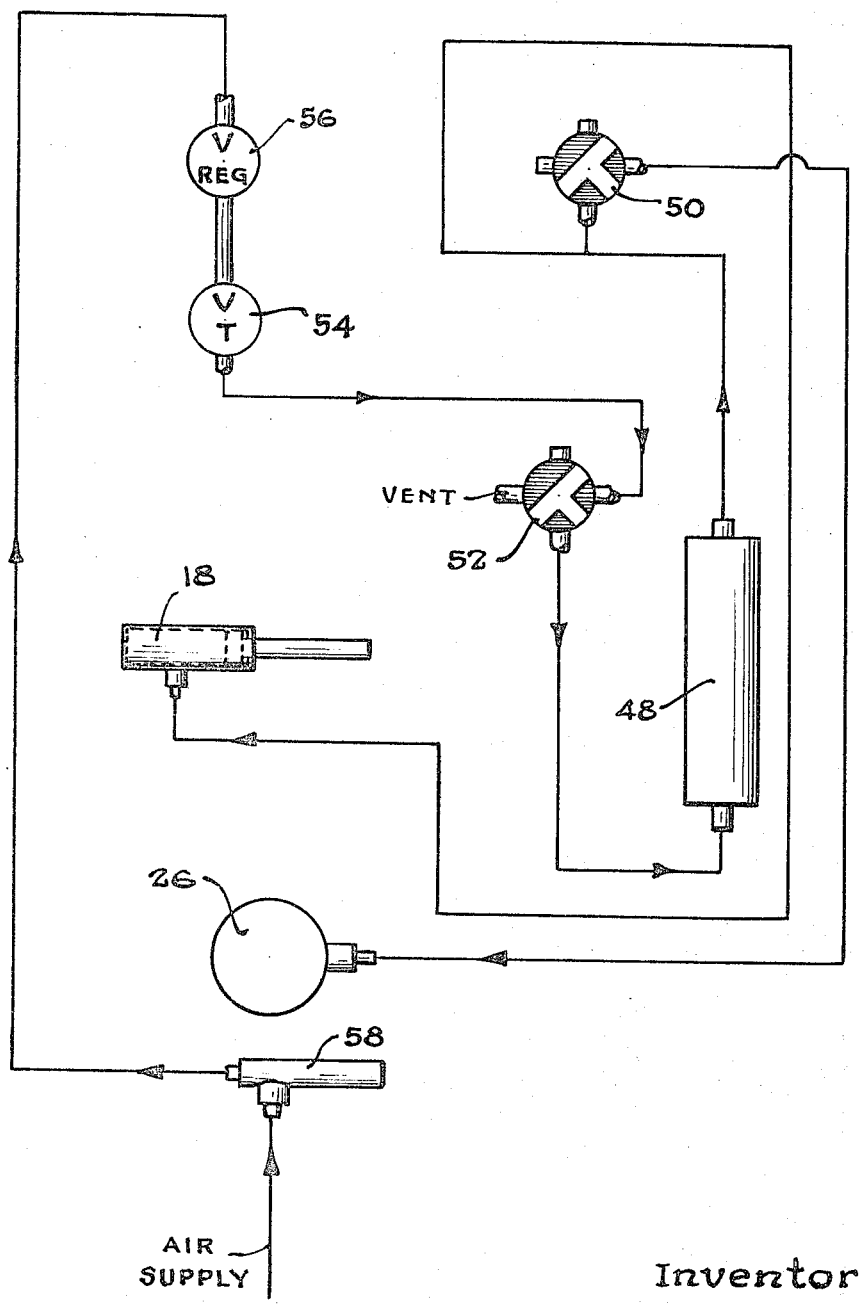

United States Patent Office 3,308,654
Patented Mar. 14, 1967

3,308,654
METHOD AND APPARATUS FOR TESTING TENDERNESS
Durward B. Badgley, Chicago, Ill., assignor to Swift & Company, Chicago, Ill., a corporation of Illinois
Filed Oct. 3, 1963, Ser. No. 313,551
9 Claims. (Cl. 73—81)

This application deals with an improved method and apparatus for making comparative tests of tenderness of a material; and more specifically deals with the comparative testing for tenderness of meat items.

It is often a requirement, in the production of various items, to make certain tests for quality control. In the production of food items and in particular in the meat packing industry, it is highly advantageous to have a reliable method and means to make comparative tests of tenderness of various portions or cuts so as to assign a proper quality representation to such items. For example, a problem in the meat industry which led to the embodiments of the present method and apparatus herein disclosed, was a necessary determination of quality for livers and certain other organs of animals which were subjected to a tenderizing treatment involving the antimortem injection of a proteolytic enzyme solution. Such a treatment process is disclosed in United States Letters Patent No. 2,903,362, issued September 8, 1959 and No. 3,052,551, issued September 4, 1962.

It was found that certain animals, thus treated and upon being slaughtered, yielded livers which subsequently appeared to be over-tenderized upon cooking. The incidence of such livers, which were undesirable on the household consumer market, was unpredictable. In many instances, the livers would not be adversely affected to any detectable extent. However, in other instances livers would be unmarketable in household consumer trade. Accordingly, a quality analysis was introduced as a control so that the overly tendered livers could be removed from consumer sales and either used in the manufacture of processed meat items or the like, or rejected, as the degree of tenderness indicated.

However, evaluation of such livers at one or a number of slaughtering plants necessarily was undertaken by a great number of operators whose personal judgment varied and was not uniform. Accordingly, a uniform method and means for performing this test became highly desirable.

Accordingly, the principal object of the present invention is to provide an improved method and apparatus for testing tenderness in a given item.

A further object of the present invention is to provide an improved method and apparatus for testing the tenderness of livers and other animal organs.

A still further object of the present invention is to provide an improved method and apparatus for determining the comparative tenderness of an item by measuring the force necessary to extrude a portion of the item a given amount.

Fundamentally, the method of the present invention involves the application of a gradually increasing force across a selected surface portion of a sample, such force being applied against the surface within a given configuration wherein one or more open areas, having no force applied thereto, are left exposed for the extrusion of the sample in a direction opposite that of the force. The force is increased until extrusion of the sample at the aforementioned areas reaches a given amount; and at the latter instant an indication of the magnitude of force is recorded. The latter serves as a comparative measure of tenderness of the sample.

A basic apparatus for carrying out the above method comprises a base upon which a sample may be placed and a pressure means thereabove for exerting force in a direction toward the base. An indenting and sensing means is connected to the pressure means for applying the force in the above mentioned manner to cause extrusion of the sample in certain areas and also to detect when the extrusion reaches a given amount. A recording means is also connected to the pressure means to indicate the magnitude of pressure developed therein.

Further objects and advantages of the present invention will become apparent upon reading the following specification in conjunction with the drawings, wherein:

FIGURE 1 is a general front perspective view of the device of the present invention;

FIGURE 2 is an enlarged elevation view of a portion of the apparatus shown in FIGURE 1 comprising the indenting and sensing means;

FIGURE 3 is an end view of the means shown in FIGURE 2; and

FIGURE 4 is a schematic diagram of a pneumatic circuit for the apparatus of FIGURE 1.

In practicing the method of the present invention it is contemplated that valuable comparative tenderness information may be obtainable for a wide variety of food items, both cooked and uncooked. With specific reference to the testing of treated livers, as previously outlined, it is necessary that the samples be cooked as the action of the tenderizing enzyme composition takes place during cooking. In this particular embodiment it is desired that a slice of approximately 3/8 inch thickness be removed from the anterior end of each liver to be tested. The slice should represent about 2 square inches of area and no skin should be present on the sliced surfaces. These samples are preferably cooked by immersion for approximately 3½ minutes in frying fat at approximately 220° F. After cooking, the samples are blotted to remove liquid and subjected to the following test predure as quickly as possible.

The sliced surface of the sample is exposed upwardly above a rigid, nondeformable base. The upper exposed surface is then pressed in a localized configuration with a presser foot instrument, preferably of circular shape, having a flat engaging surface and one or more uniform openings in the latter surface extending upwardly through the foot. By using an instrument of this sort force is applied to a portion of the sample surface within a given configuration wherein one or more areas within the configuration will not be subjected to the force.

The force applied to the sample in this manner, and it is to be understood that for the purpose of this disclosure the terms force and pressure may be regarded as substantially equivalent since the instrument through which such force or pressure is applied to a sample is uniform from one item to the other, is gradually increased at a controlled rate. Preferably, force may be applied and readily controlled through pneumatic or hydraulic means although other mechanical or electrical apparatus may be applicable.

As the force is increased the sample will tend to extrude in the areas at which no force is applied, in a direction opposite to the force. When the latter extrusion reaches a given reference level the magnitude of force being applied at that instant is recorded and constitutes a comparative indicium of tenderness for that sample.

Initially, it is also necessary to analyze a number of the same items tested in the aforementioned manner, by a test panel or the like, to establish a suitable frame of reference by which comparative data obtained by the present method may be correlated with quality values based upon the characteristics of human or consumer preference.

A preferred embodiment of an apparatus for carrying out the foregoing method is shown in FIGURES 1 through 4. In this apparatus the elements are mounted upon a frame generally 10 having a lower base plate 12, to receive a sample, and an upright rear panel 14 connected thereto. A pressure means generally 16 is mounted on the upright panel 14 above the base plate 12. Preferably, the pressure means 16 comprises a miniature pneumatic cylinder 18 having a piston rod 20 extending downwardly from a piston (not shown) internal thereof. The pneumatic cylinder 18 is positioned and supported within a mounting bracket 22 of a split ring type structure. It is also desirable in the preferred embodiment, for reasons which will become clear, to electrically insulate the pressure means 16 from the frame generally 10 by means of an insulator collar 24 between the pneumatic cylinder 19 and mounting bracket 22.

A recording means consisting, in the preferred embodiment, of an air pressure gauge 26 is connected to the pneumatic cylinder 18 and mounted adjacent thereto on the panel 14. The connection between the gauge 26 and pneumatic cylinder 18 is shown in detail in FIGURE 4 and preferably is made with an electrically non-conductive tubing material such as nylon.

At the dependent end of piston rod 20 an indenting and sensing means in the form of a sensing head generally 28 is mounted. The latter, shown in detail in FIGURES 2 and 3, comprises a circular shaped presser foot 30 having a flat lower surface 32 and a plurality of uniform, equally spaced, cylindrical openings 34 extending upwardly from the lower surface. It is also preferred that the presser foot structure be of a non-conductive material and the latter is attached to the piston rod 20 by way of a mounting sleeve 36. An upper portion of the sensing head generally 28 comprises a mounting ferrule 38 embracing the piston rod 20 having a body in the form of a disc 40 from which a plurality of pointed electrodes 42 extend to a level within the cylindrical openings 34 in the presser foot generally 30. The mounting ferrule 38 is mounted upon piston rod 20 by a sleeve 44.

Air under pressure is introduced to the pneumatic cylinder 18 from a source (not shown) in a manner whereby the pressure within the cylinder gradually increases. This is accomplished through a pressure regulating means best seen in FIGURE 4. An air chamber 48 of relatively substantial volume is connected directly to the cylinder 18, and also connected to pressure gauge 26 through an air valve 50. The connection between these parts is such that when the air valve 50 is opened the gauge will indicate pressure introduced to the cylinder 18; and when the valve is closed the pressure at that instant will be locked in the gauge and will not change regardless of any other forces exerted at the cylinder.

The air chamber 48 is connected to a vent valve 52 which in turn is connective between the chamber and either atmosphere or an adjustable flow control valve 54. In turn, the flow control valve 54 receives pressurized air from an adjustable pressure regulator 56 and air filter 58 which are, in turn connected to the supply of air under pressure, now shown. It will become apparent from FIGURE 4 that the maximum pressure obtainable, and the rate of introduction of air to the chamber 48 are controlled by the pressure regulator 56 and flow control valve 54, respectively. Thus, upon initially operating the device, the pressure of air within the chamber 48 will gradually increase from atmospheric to the maximum pressure over a period of time. Concurrently the pressure in cylinder 18 will increase with the pressure in chamber 48. Also, following a test the vent valve 52 may be operated to return the air chamber and cylinder to atmospheric pressure. In the preferred device it is desired that the maximum pressure be limited to approximately 60 p.s.i.g. and that the flow control valve 54 be adjusted so that an increase in pressure from atmospheric to about 50 p.s.i.g. takes approximately 10 seconds.

Since it is difficult to visually determine when a given amount of extrusion of the sample is achieved, as for instance when electrodes 42 of the preferred apparatus contact material of the sample extruded upwardly through the cylindrical openings 34, it is convenient to detect this condition electrically. Accordingly, a volt meter 60 having a pair of leads 62, 64 is connected with a source of electrical power, the electrodes 42 and a sample placed on the base plate 12. As is shown in FIGURE 1 this may be done by connecting the lead 62 to the base plate 12 and the remaining lead 64 directly to the pressure means generally 16. However, in certain instances the lead 62 may be connected directly to the sample as, for instance, where the base plate 12 is constructed of a non-conductive material.

To operate the device above described, an operator first sets the pressure regulator 56 to limit the maximum pressure introduced into the device. The vent valve 52 is then turned to connect the air chamber 48 to atmosphere. Air valve 50 is then opened and the vent valve 52 closed to connect the air chamber 48 with the supply of pressurized air. The operator then times the period required for the air pressure gauge 26 to rise about 50 p.s.i. Thereafter the flow valve 54 is adjusted and the preceding operation repeated, where necessary, until the time period is about 10 seconds. The device will then be in condition for testing samples.

A number of samples are prepared and then individually tested by first venting the air chamber 48 and cylinder 18 through the vent valve 52 before placing the sample on the base plate 12. The lower surface 32 of the presser foot generally 30 is then gently placed against the upper surface of the sample, and the operator checks to see that the air valve 50 is open to connect the gauge 26 directly with the air chamber 48. The apparatus has also in the meantime been connected to the volt meter 60 by leads 62, 64 as previously described.

The specific testing is then accomplished by turning the vent valve 52 to the position connecting air chamber 48 directly with the source of air under pressure through the flow control valve 54. As the system increases in pressure the presser foot generally 30 will be urged with increasing force into the sample on base plate 12 and the sample will tend to extrude upwardly into the cylindrical openings 34. As the pressure in cylinder 18 increases further, the extruded material will come into contact with the electrodes 42 completing the volt meter circuit between the leads 62, 64 through the sample itself. At this time, the volt meter will indicate current flow through the sample and the operator immediately closes the air valve 50. This locks the existent air pressure in the gauge 26 and the latter is recorded as a comparative indicium of tenderness for that sample. Obviously provision may be made for automatically closing valve 50 upon completion of the sensing circuit through the use of a solenoid or the like.

Thereafter vent valve 52 is opened and the air valve 50 is opened to lower the pressure within the system to atmospheric; and the sample is removed from the base plate 12. The foregoing operations are then repeated with each succeeding sample to be tested.

Obviously many modifications and variations of the invention as hereinbefore set forth may be made without departing from the spirit and scope thereof, and therefore only such limitations should be imposed as are indicated in the appended claims.

I claim:

1. An improved method for determining comparative tenderness of a food item, said method comprising: applying a gradually increasing force across a selected surface portion of said item, said surface portion being characterized as surrounding an area where zero force is applied; extruding the sample from said area in a direction opposite said force; increasing said force until the extrusion of said sample reaches a given amount; and recording the magnitude of said force necessary to produce said given amount of extrusion.

2. An improved method for determining comparative tenderness of a plurality of cooked livers, said method comprising: removing a prescribed sample portion from each of said livers to be tested; cooking each of said samples under uniform prescribed conditions; applying a gradually increasing force across a selected surface portion of each cooked sample, said surface portion being characterized as surrounding a plurality of spaced areas where zero force is applied; extruding the sample from said areas in a direction opposite said force; continuously indicating the magnitude of force being applied; sensing the moment that the sample extrudes a given distance from said area; fixing the indication of said force at said moment; and comparing the indications whereby to determine the relative tenderness of each sample.

3. An improved apparatus for comparative testing tenderness of an item, said apparatus comprising: a base for receiving a sample of the item; surface contacting means for exerting a force against a portion of a surface of said sample, said means containing a plurality of spaced open areas having no contact with the sample; pressure means to apply a gradually increasing pressure against said surface contacting means; sensing means positioned at a given level above said open areas to detect extrusion of the item to said given level above said open areas as said pressure increases; and recording means to display an indication of the relative pressure being exerted by said pressure means when the extrusion of said item reaches said given level.

4. An improved apparatus for comparative testing tenderness of an item, said apparatus comprising: a base plate for receiving a sample of the item to be tested; a pneumatic cylinder and piston spaced above said base plate having a piston rod extending downwardly toward said plate; a circular-shaped presser foot attached to an end of said piston rod, said presser foot having a lower substantially planar surface parallel and opposite said base plate and a plurality of uniform circular openings equally spaced about said surface extending upwardly therefrom; pressure means to apply a gradually increasing pressure against said presser foot; sensing means positioned at a given level above said surface of said presser foot and within the openings therein to detect extrusion of said item through said openings to said given level; and recording means to display an indication of the relative pressure being exerted upon a sample by said presser foot when said sample reaches said given level.

5. An improved apparatus for comparative testing tenderness of an item, said apparatus comprising: a base plate for receiving a sample of the item to be tested; a pneumatic cylinder and piston spaced above said base plate having a piston rod extending downwardly toward said plate; a circular-shaped presser foot attached to an end of said piston rod, said presser foot having a lower substantially planar surface parallel and opposite said base plate and a plurality of uniform circular openings equally spaced about said surface extending upwardly therefrom; a plurality of electrodes positioned at a given level above said surface of said presser foot and within the openings therein to detect extrusion of said item through said openings to said given level, said electrodes being electrically insulated from the base plate; pressure means to apply a gradually increasing pressure against said presser foot; and recording means to display an indication of the relative pressure being exerted by said presser foot.

6. An improved apparatus for comparative testing tenderness of an item, said apparatus comprising: a base for receiving a sample of the item; surface contacting means for exerting a force against a portion of a surface of said sample, said means containing a plurality of spaced open areas having no contact with the sample; a pneumatic cylinder and piston spaced above said base plate having a piston rod extending downwardly toward said plate and connected to said surface contacting means; an air chamber connected to said pneumatic cylinder by an air line; a pressure gauge connected to said air line to indicate the air pressure applied at a given time to said pneumatic cylinder; an air valve connected between said pressure gauge and said air line to control the flow of air therebetween; a supply of air under pressure connected to said air chamber; and a flow regulator valve connected between said supply and said air chamber to control the rate of increase in air pressure within said air chamber and hence within said pneumatic cylinder; and sensing means positioned at a given level above said open areas to detect extrusion of said sample to said given level.

7. The apparatus of claim 6 wherein a vent valve is connected between said flow regulator valve and said air chamber.

8. An improved apparatus for comparative testing tenderness of a meat item, said apparatus comprising: a base plate for receiving a sample of the item to be tested; a pneumatic cylinder and piston spaced above said base plate having a piston rod extending downwardly toward said plate; a circular-shaped presser foot attached to an end of said piston rod, said presser foot having a lower substantially planar surface parallel and opposite said base plate and a plurality of uniform circular openings equally spaced about said surface extending upwardly therefrom; a plurality of electrodes positioned at a given level above said surface of said presser foot and within the openings therein to detect extrusion of said item through said openings to said given level, said electrodes being electrically insulated from said base plate; an air chamber connected to said pneumatic cylinder; an air valve connected between said pneumatic cylinder and said air chamber to control the flow of air therebetween; a pressure gauge connected to said valve to indicate the air pressure applied at a given time to said pneumatic cylinders; a supply of air under pressure connected to said air chamber; a flow regulator valve connected between said supply and said air chamber to control the rate of increasing air pressure within said air chamber and hence within said pneumatic cylinder; and a vent valve connected between said air chamber and said flow regulator valve.

9. The apparatus of claim 8 wherein a volt meter is connected to said electrodes and to said base plate, said volt meter serving to sense and indicate the moment contact is made between a test item and said electrodes.

References Cited by the Examiner

UNITED STATES PATENTS

| | | | |
|---|---|---|---|
| 2,066,016 | 12/1936 | Rossi et al. | 73—15.4 X |
| 2,108,746 | 2/1938 | Erichsen. | |
| 2,112,190 | 3/1938 | Dillon et al. | 73—56 |
| 2,119,699 | 6/1938 | Bloom | 73—56 |
| 2,125,483 | 8/1938 | Blanchard | 73—94 |
| 2,296,160 | 9/1942 | Gross | 73—94 X |
| 2,363,930 | 11/1944 | Basquin | 73—97 |
| 2,652,718 | 9/1953 | Wiseman | 73—78 |
| 2,904,994 | 9/1959 | Claxton | 73—56 X |

FOREIGN PATENTS

| | | |
|---|---|---|
| 621,375 | 11/1935 | Germany. |
| 117,351 | 2/1956 | Russia. |

RICHARD C. QUEISSER, *Primary Examiner.*

E. D. GILHOOLY, *Assistant Examiner.*